United States Patent [19]

Müller

[11] Patent Number: 4,818,505

[45] Date of Patent: Apr. 4, 1989

[54] PROCESS FOR REMOVING OR SEPARATING POLLUTANTS FROM WASTE GASES

[76] Inventor: Dietrich Müller, Handelmannweg 1, D-2000 Hamburg 52, Fed. Rep. of Germany

[21] Appl. No.: 832,150

[22] Filed: Mar. 28, 1986

Related U.S. Application Data

[63] Continuation of Ser. No. 602,428, Apr. 20, 1984, abandoned.

[30] Foreign Application Priority Data

Apr. 26, 1983 [DE] Fed. Rep. of Germany ....... 3314969

[51] Int. Cl.$^4$ .............................................. B01D 53/34
[52] U.S. Cl. ..................................... 423/210; 44/589; 423/242; 423/243; 423/244
[58] Field of Search ................... 423/220, 225, 242 A, 423/242 R, 243, 244 A, 244 R, 210; 55/72, 73; 210/711; 71/13; 44/10 A, 589, 590

[56] References Cited

U.S. PATENT DOCUMENTS

| | | | |
|---|---|---|---|
| 3,944,408 | 3/1976 | Postrihac | 71/13 |
| 4,038,180 | 7/1977 | Talbert | 210/10 |
| 4,302,236 | 11/1981 | Roman | 71/9 |

FOREIGN PATENT DOCUMENTS 9337 5/1902 United Kingdom ..................... 44/1

OTHER PUBLICATIONS

Noyes et al., *A Course of Study in Chemical Principles,* MacMillan Company, 1938, p. 70.

*Primary Examiner*—John Doll
*Assistant Examiner*—Jeffrey E. Russel
*Attorney, Agent, or Firm*—Cushman, Darby & Cushman

[57] ABSTRACT

The invention relates to a process for the removal or separation of pollutants, such as sulphur or metal compounds from waste gases, by contacting the waste gases with aqueous binder suspensions, comprising using a sewage sludge as the binder suspension. The binder suspension is preferably constituted by a sewage sludge mixed with comminuted, dried autumn leaves or an extraction residue thereof and to which are added further additives, particularly alkaline substances. Apart from the excellent manner in which sewage sludge binds pollutants, roasting is made more economic due to the high carbon content of the sewage sludge.

19 Claims, No Drawings

PROCESS FOR REMOVING OR SEPARATING POLLUTANTS FROM WASTE GASES

CROSS REFERENCE TO RELATED CASES

This is a continuation of application Ser. No. 602,428, filed Apr. 20, 1984, now abandonded.

This application is related to Muller application Ser. No. 554,712 filed Nov. 23, 1983 and now U.S. Pat. No. 4,552,666 (the entire disclosure of application Ser. No. 554,712 is hereby incorporated by reference and relied upon), now U.S. Pat. No. 4,666,498, Muller application 554,713 filed Nov. 23, 198, now U.S. Pat. No. 4,666,498. The parent application (Ser. No. 602,428) of this application is abandoned.

BACKGROUND OF THE INVENTION

The invention relates to a process for removing or separating pollutants, such as sulphur or metal compounds from $SO_2$-containing flue or other waste gases by contacting the latter with aqueous binder suspensions.

The problem of economically removing pollutants from flue and other waste gases has not hitherto been solved. Although there are numerous processes for the selective removal of sulphur dioxide from flue gases, such as a process involving washing with a sodium sulphite solution or with aqueous ammonia solutions at 60° to 70° C. and subsequent thermal regeneration, as well as processes involving washing with dilute sulphuric acid or with calcium sulphite solutions, they suffer from the disadvantage that the contacting solutions used require considerable expenditure for apparatus, due to their corrosive properties. The also known dry sorption processes, e.g. according to Austrian Pat. No. 283,289, in which specially produced, usually hydroxidic absorption materials are used, which materials are regenerated following sulphur absorption and which have to be moved backwards and forwards whilst involving considerable transportation costs between the absorption point, e.g. the power station, and the regeneration point, e.g. a sulphuric acid plant, are also complicated and therefore uneconomical, especially because considerable quantities of coke are required for roasting purposes.

A fundamental disadvantage of these processes, which have essentially been proposed for fuel or flue gas desulphurization is that they fail to remove other pollutants, such as heavy metals present in the waste gas.

In addition, DE-OS No. 2,237,929 discloses a process for using biomass for removing gaseous organic waste gases or at least waste gases containing organic constituents. Activated sewage sludge can be used as the biomass, so that the organic pollutants in the waste gases, such as occuring the foodstuffs industry, are degraded via the metabolism of microorganisms.

Finally, it is known from DE-OS No. 2,248,256 to filter spent air, biologically activated humificated substances being used as the solid filter material.

The problem of the present invention is to eonomically remove or separate pollutants from waste gases using a process of the aforementioned type, whilst not being limited solely to desulphurization, but instead effectively removing other solid, liquid and gaseous pollutants, such as toxic substances. Moreover, the sorbent used for binding the pollutants is to be in the form of a product, which is itself a valueless waste product to be eliminated, i.e. it is inexpensive and ready to use, whilst involving much lower preparation and transportation costs. Finally, it not only permits desulphurization, but also the elimination of other pollutants and can make them available again in regenerated form. In addition, roasting is to take place in a more economic manner.

SUMMARY OF THE INVENTION

Surprisingly, this problem can be solved by carrying out the per se known contacting of the waste gases with aqueous binder suspensions in such a way that digested sewage sludge is used as the binder suspension.

This leads to the advantage that a mass waste material can appropriately be used and that pollutants present in the latter can be recovered in usabe form together with the pollutants present in the waste gases. A further advantage is that the sewage sludge used according to the invention already has a considerable carbon content, so that little or no coke has to be added for roasting purposes.

It is surprising that digested sewage sludge can be used for removing pollutants from $SO_2$ containing waste gases, because in the known process of DE-OS No. 2,237,929 pollutant removal is not possible with activated sludge. This is probably due to the fact that the microorganisms are destroyed by $SO_2$, whereas in the process according to the invention, the $SO_2$ is oxidized from the waste gases and the polyvalent metals, such as e.g. iron present in the digested sewage sludge probably act catalytically, sulphates being obtained. In part, the sulphides present in the digested sewage sludge are converted into hydrogen sulphide by the $SO_2$. As a result of a redox reaction, elementary sulphur is formed from the hydrogen sulphide and is able to bind by means of thio compounds the nitrogen oxides present in the waste gas. The toxic heavy metals are either bound as a sulfate, e.g. lead, or as sulphide, e.g. arsenic, cadmium or mercury.

When using a preferably digested sewage sludge suspension with comminuted autumn leaves, the carbon content of the sewage sludge is increased and, based on the dry substance, represents approximately 30 to 40%, so that the sorption capacity, particularly with respect to gaseous and fine solid pollutants is increased.

The sewage sludge can be either by that obtained from sewage plants as a result of waste water treatment or other aqueous sludges, such as the excavator or dredger sludges obtained during the cleaning of rivers or harbours. The sewage sludge can optionally be worked up through the addition of water or other additives, particularly substances having an alkaline action, e.g. lime-containing substances, and is then brought into intimate contact with the waste gas to be cleaned. This can either be brought about by passing the waste gas through the sewage sludge suspension, or by spraying the aqueous sewage sludge suspension, e.g. in counterflow into the waste gas. Optionally, the sewage sludge can also be suspended with the pressurized water from a briquetting means for producing briquets from sewage sludge mixed with autumn leaves.

It is surprising that substantially all the pollutants, including sulphur compounds, can be removed by sewage sludge from flue and other waste gases and that in the process according to the invention, the pollutants originally present in the sewage sludge are obtained together with the pollutants absorbed by the waste gas.

This advantage is increased if the fuel used is highly polluted fuel briquets made from sewage sludge treated with autumn leaves.

The sewage sludge suspension is preferably used in a 2 to 20% aqueous suspension, e.g. a 10% aqueous suspension or a 4% aqueous suspension. The sewage sludge can be led in circuit form and part thereof can be removed. The charged sewage sludge mass is subsequently roasted in per se known manner. Its considerable carbon content aids the reducing roasting, so that metallic pollutants are obtained in elementary form and it is also possible to obtain a $SO_2$-rich gas or sulphur. Instead of reducing roasting, the metals can also be leached out by acids and can also be separated in other per se known ways, e.g. electrolytically.

As the sewage sludge also contains in very small quantities a number of valuable heavy metals, such as e.g. lead, cadmium, chromium, copper, iron, magnanese, nickel, mercury and zinc, there is still a considerable absorption capacity with respect to the pollutants obtained during combustion. Apart from these partly amphoteric heavy metals, the sewage sludge also contains basic metals, such as calcium, potassium, magnesium and sodium in much higher concentrations. As basic constituents, these metals which are probably present in the reactive hydrated oxide compound aid the $SO_2$-absorption, whilst the amphoteric heavy metal compounds act as oxygen donors.

As the sewage sludge has a considerable absorption capacity for pollutants and as said sewage sludge supplies its own mainly metallic pollutants, in addition to those absorbed from the waste gas, finally fully charged sludges with an extraction-justifying concentration of metallic pollutants are obtained, which can be roasted e.g. in the same way as pyrites, but have the advantage that, due to the high carbon content of e.g. 40% already present in the sewage sludge, a considerable calorific value and a welcome reduction potential can also be provided.

An important advantage of the process according to the invention is that a good waste gas cleaning is made possible by a per se unusable sewage sludge and that further the environmentally prejudicial pollutants can be removed together from the sewage sludge and from the waste gases. A further advantage of the process is that there is no need to regenerate the sorption material, because sewage sludge is available virtually everywhere in unlimited quantities as a waste product. Thus, it is merely necessary to separate the pollutants and to discard the ashes freed therefrom after roasting or to supply them to other uses, such as e.g. the production of porous components or as soil conditioners.

According to the invention, the sewage sludge suspension is preferably passed through the hot waste gases in counterflow in such a way that the sewage sludge is partly dried. As a result, it is present in liquid form in part of the binding zone and in solid or moisture-proof form in a further part, so that pollutants are absorbed in two different stages and in different aggregate states of the binder.

A further particularly effective process variant is obtained in connection with the pollutant sorption from waste gases in that to the sludge suspension is added the ash from fuel briquets, which have been manufactured from charged sludge and a second carbon-containing component in the form of material waste, on the basis of the process according to DE-OS No. 3,243,827 and related Muller U.S. application Ser. No. 554,712, now U.S. Pat. No. 4,552,666.

It has surprisingly been found, that pollutant-charged aqueous sludges, or their aqueous suspensions, on adding e.g. autumn leaves or the extraction residue thereof, straw or garbage can be processed to fuel briquets.

If the ash from such fuel briquets is added to the sludge suspension, the pollutant-sorbing action thereof is once again surprisingly significantly increased. Thus, such ash reacts alkaline in aqueous suspension and not acid, which would have been expected in view of the original $SO_2$-charge of the sludges used for fuel briquet manufacture.

Clearly, part of the constituents of the solid addition and the sludge are converted into burnt oxides, which constitute alkaline buffers in suspension. Moreover, with the aid of the carbon-containing constituents of the briquets, there is probably a reducing decomposition of the compounds obtained during the charging of the sludge suspension.

If such ash is added to a sludge suspension, the sorption activities of the two constituents, sludge and ash are summated, in that the alkalinity is considerably reduced. The now chemically reduced constituents have much higher activities, particularly for the absorption of $SO_2$ and $NO_x$.

Thus, there is in pracice a very important link between waste gas cleaning by sludges and the production of fuel briquets from sludge and waste solids. Thus, on the basis of the use of aqueous sludge suspensions for binding $SO_2$ and other pollutants of the waste gases, a suspension charged with such pollutants is obtained. On adding solid waste of the aforementioned type, it is possible to manufacture fuel briquets, on this occasion with a suspension in which the absorption of pollutants has already taken place.

If these briquets are burned with a heat gain, neither $SO_2$, nor $H_2S$, nor other harmful gases have been observed in the flue gases of this combustion process.

The thus obtained ash is now supplied as a particularly effective sorbent to the suspension circuit of the waste gas cleaning operation, optionally accompanied by the addition of water. As a result, there is a constant increase in the pollutant-binding sorption material, which becomes constantly more active. The circulating suspension is drawn off every so often and the cycle is started anew.

After drying and adding strong acids, such as sulphuric acid, there is no gas evolution or odours from such charged suspensions. This allows the conclusion to be drawn that only nondecomposable compounds are formed during the pollutant charging of the sludges and such compounds can be safely dumped. If as a result of the multiple circulation of the suspension, the pollutants absorbed therein are enriched to such an extent that the extraction of usable products is worthwhile, the working up of the charged substances is preferred as compared with dumping.

If the process is performed in such a way that the waste gas cleaning is performed in a cleaning absorber simultaneously acting as a stack, the hitherto very high chimneys can be made shorter, or can be given a completely different configuration, e.g. for the recovery of heat of waste gases.

The process can comprise, consist essentially of or consist of one of the stated steps with the recited materials.

The invention is described in greater detail hereinafter relative to the examples.

DETAILED DESCRIPTION

EXAMPLE 1

A synthetic flue gas with a content of approximately 1% by weight $SO_2$ with residual air was passed by means of a water jet pump through two gas washing bottles, the first being filled with a 10% sewage sludge suspension and the second with an iodized starch solution. The blue iodized starch suspension momentarily discolours as soon as the first traces of $SO_2$ enter it. This only takes place after a residence time of approximately 40 minutes, i.e. up until then the sewage sludge suspension had brought about a 100% removal of the $SO_2$ from the gas flow.

The charged sewage sludge suspension was dried and heated in a porcelain tube over a Bunsen flame in the oxygen flow. The roasting gases obtained were collected in a gas washing bottle with $H_2O_2$-containing NaOH solution of known strength. By back titration, a $H_2SO_4$ content was detected, which accurately corresponded to the sorbed quantity of $SO_2$. This test shows that the $SO_2$ sorbed by the sewage sludge suspension can be easily regenerated.

EXAMPLE 2

Two fuel briquets made from sewage sludge and autumn leaves according to DE-OS No. 3,243,827 and related Muller U.S. application Ser. No. 554,712, now U.S. Pat. No. 4,552,666 to which additionally a small amount of a lead compound was added, were burned in a small test furnace. The flue gases obtained were passed through a 0.1N $H_2SO_4$-containing gas washing bottle, in which heavy metals were clearly detected.

The waste gases were previously passed through a gas washing bottle containing a sewage sludge suspension. It was not possible to detect any heavy metals in the following $H_2SO_4$-containing washing bottle, which means that the sewage sludge suspension had completely combined the heavy metals.

After drying, the charged sewage sludge suspension was comminuted in a mortar and exposed to a Bunsen flame on an asbestos wire gauze. Several small buttons of elementary lead were obtained, which means that the pollutants absorbed by the sewage sludge suspension can be recovered in elementary form due to the reducing carbon present in the sewage sludge.

In general, in an industrial scale process, the sewage sludge, optionally with further additives and the pressurized water from a sewage sludge briquetting plant can be supplied as a suspension to a waste gas cleaner installed between the waste gas side of a boiler and the stack and hot flue gases tube flow through it from bottom to top in an inner tube. The sewage sludge suspension is sprayed in annular manner from top to bottom against this waste gas flow distributed radially outwards in annular manner by the inner tube and is consequently intimately vortexed with the waste gas, so that it absorbs its pollutants in an initially liquid phase. Simultaneously, the suspension is dried by the heat of the waste gas, so that the upper part of the waste gas cleaner also functions as a spray drier. The moisture-proof phase of the sewage sludge forms in the lower part of the waste gas cleaner, an annular, downwardly sinking moving layer, through which flows at right angles from the inside to the outside the waste gas and takes up here the pollutants and fly ash thereof. On further drying, the charged solid sewage sludge material is discharged from the waste gas cleaner with the sorbed pollutants and then, optionally following a partial carrying in circuit for suspension preparation, is supplied in the fully charged state for the separation of the pollutants.

What is claimed is:

1. A process for removing or separating pollutants including heavy metal pollutants and $SO_2$ from flue gas comprising the following step:
   contacting the flue gas having said heavy metal pollutants and less than or equal to 1.0% by weight of $SO_2$, with a binder suspension consisting essentially of sludge in an aqueous suspension having 2 to 10% sludge solids consisting of digested sewage sludge.

2. A process according to claim 1, wherein the binder suspension consists of digested sewage sludge mixed with comminuted, dried autumn leaves or with the solvent extraction residue of comminuted, dried autumn leaves, the comminuted dried autumn leaves being 30-40% of the carbon content on a dry basis of the binder suspension.

3. A process according to claim 1 comprising adding an alkaline substance to the digested sewage sludge suspension.

4. A process according to claim 3 comprising passing the flue gas through the digested sewage sludge suspension.

5. A process according to claim 1 comprising passing the flue gas through the digested sewage sludge suspension.

6. A process according to claim 3 comprising spraying the digested sewage sludge suspension into the flue gas.

7. A process according to claim 1 comprising spraying the digested sewage sludge suspension into the flue gas.

8. A process according to claim 1 comprising passing the digested sewage sludge suspension through the flue gas in counterflow in a binding zone such a way that the digested sewage sludge is partially dried and in one part of the binding zone is present in liquid form and in a further part of the binding zone is present in solid form and absorbing the pollutants in two stages in different aggregate states of the binder.

9. A process according to claim 3 comprising passing the digested sewage sludge suspension through the flue gas in counterflow in a binding zone in such a way that the digested sewage sludge is partially dried and in one part of the binding zone is present in liquid form and in a further part of the binding zone is present in solid form and absorbing the pollutants in two stages in different aggregate states of the binder.

10. A process according to claim 4 comprising passing the digested sewage sludge suspension through the flue gas in counterflow in a binding zone such a way that the digested sewage sludge is partially dried and in one part of the binding zone is present in liquid form and in a further part of the binding zone is present in solid form and absorbing the pollutants in two stages in different aggregate states of the binder.

11. A process according to claim 6 comprising passing the digested sewage sludge suspension through the flue gas in counterflow in a binding zone such a way that the digested sewage sludge is partially dried and in one part of the binding zone is present in liquid form and in a further part of the binding zone is present in solid form and absorbing the pollutants in two stages in different aggregate states of the binder.

12. A process according to claim 1 comprising carrying out the flue gas cleaning in a cleaning absorber simultaneously acting as a stack.

13. A process according to claim 1 comprising processing the pollutant-charged digested sewage sludge with a carbon-containing material waste to form fuel briquets.

14. A process according to claim 13 wherein the carbon-containing material waste is dried autumn leaves or the solvent extraction residue of dried autumn leaves.

15. A process according to claim 13 wherein the carbon-containing material waste is straw or garbage.

16. A process according to claim 9 comprising adding to a new digested sewage sludge suspension the ash obtained after burning the fuel briquettes produced from a digested sewage sludge previously employed for cleaning $SO_2$-containing flue gas and using the new digested sewage sludge suspension to remove or separate pollutants from a further batch of $SO_2$-containing flue gas.

17. A process according to claim 1 wherein said flue gas is contacted with said digested sewage sludge for a period of time less than or equal to 40 minutes.

18. A process for removing or separating pollutants including heavy metal pollutants and $SO_2$ from flue gas comprising the following step:
   contacting the flue gas having said heavy metal pollutants and less than or equal to 1.0% by weight of $SO_2$, with a binder suspension consisting essentially of sludge in an aqueous suspension having 2 to 10% sludge solids consisting of a member of the group consisting of digested sewage sludge, excavator sludge and dredger sludge.

19. A process for removing or separating pollutants including heavy metal pollutants and $SO_2$ from flue gas consisting of the following step:
   contacting the flue gas having said heavy metal pollutants and less than or equal to 1.0% by weight of $SO_2$, with a binder suspension consisting essentially of sludge in an aqueous suspension having 2 to 10% sludge solids consisting of digested sewage sludge.

* * * * *